United States Patent [19]

Whitaker

[11] Patent Number: 4,513,987
[45] Date of Patent: Apr. 30, 1985

[54] SELF-CONTAINED LIFTING APPARATUS FOR LOW-BOY TRAILERS

[75] Inventor: Gene C. Whitaker, Wilbur, Oreg.

[73] Assignee: Whitlog, Inc., Wilbur, Oreg.

[21] Appl. No.: 429,098

[22] Filed: Sep. 30, 1982

[51] Int. Cl.³ .......................... B60P 1/34; B62D 53/06
[52] U.S. Cl. ................................. 280/423 B; 414/481
[58] Field of Search ...................... 280/423 B, 425 A; 414/481

[56] References Cited

U.S. PATENT DOCUMENTS

| | | | |
|---|---|---|---|
| 2,754,987 | 7/1956 | Kern | 280/425 A |
| 3,429,585 | 2/1969 | Ross | 280/423 B |
| 3,517,945 | 6/1970 | Fikse | 280/425 A |
| 3,866,947 | 2/1975 | Yakubow | 280/425 A |
| 4,367,884 | 1/1983 | Johnson et al. | 280/423 B |

Primary Examiner—John A. Pekar
Attorney, Agent, or Firm—Chernoff, Vilhauer, McClung, Birdwell & Stenzel

[57] ABSTRACT

The present invention is comprised of extensible piston cylinders which extend between first points located on a trailer and second points located on a gooseneck which interconnects the trailer to a tractor. The gooseneck and the trailer are rotatably coupled to one another at a common pivot point and the common pivot point, the first points and second points are arranged relative to one another such that as the piston cylinder is extended or retracted the gooseneck and trailer are respectively raised or lowered relative to the ground. The gooseneck is arranged so that it substantially encloses the piston cylinders throughout their entire range of travel thereby protecting them from damage. In addition a locking apparatus permits locking the piston cylinders to both the first and second points to present rotation of the gooseneck relative to the trailer. Thus the gooseneck and trailer can be removed from the tractor as a single unit.

4 Claims, 8 Drawing Figures

SELF-CONTAINED LIFTING APPARATUS FOR LOW-BOY TRAILERS

BACKGROUND AND SUMMARY OF THE INVENTION

This invention relates to an apparatus for raising and lowering a low-boy trailer between its driving and loading positions, and in particular to such an apparatus which is completely self-contained.

A low-boy trailer is arranged so that its front end can be lowered to the ground and disconnected from the towing vehicle in order to facilitate loading. This is accomplished by using a gooseneck to interconnect the trailer to the tractor, with the front end of the gooseneck being attached to the tractor by means of a fifth wheel and its rear end being attached to the trailer by means of a pin coupling. Accordingly, when the rear end of the gooseneck is raised or lowered it also moves the front end of the trailer to a raised or lowered position.

Heretofore the gooseneck has been raised and lowered by means of hydraulic jacks which are attached to the sides of the gooseneck and, in certain circumstances, this arrangement has not been effective, at least in raising the trailer. This is due to the fact that the jacks raise the gooseneck by having their rams extended while in contact with the ground on which the trailer rests. However, since trailers of this type generally are used for transporting construction equipment, they are often used on terrain which is muddy or otherwise will not support the weight of the trailer on the limited area of the rams, rams, even when they include positioning pads. In this event the rams tend to sink into the ground rather than lifting the trailer.

The present invention overcomes the shortcomings and limitations of the prior art lifting apparatus for low-boy trailers by providing a lifting system which is self-contained on the gooseneck and the trailer and is not required to interact with the surrounding terrain. The lifting apparatus comprises extensible piston cylinders which are attached pivotably at their cylinder ends to the gooseneck. The rams of the piston cylinders slidably contact ramps on the trailer at points defined by fore and aft stops. Thus when the rams of the piston cylinders are extended, the points at which they are connected to the gooseneck are moved away from the points at which they contact the trailer, causing the trailer and gooseneck to rotate in opposite directions about their common pivot point at the pin coupling. The end points of the piston cylinders and the pivot point are arranged relative to one another so that as this occurs the rear end of the gooseneck and the front end of the trailer are raised. Conversely, as the piston cylinder rams are retracted the gooseneck and trailer rotate in opposite directions about the pivot point and the front end of the trailer is lowered.

In order to provide lateral stability the rear portion of the gooseneck is bifurcated into a pair of side-by-side arms and one piston cylinder is provided for each of these arms. In addition, the rear portions of the arms are made hollow and extend rearwardly a sufficient distance so that the piston cylinders remain enclosed within the gooseneck throughout their complete range of extension.

Locking means are provided to couple the rams pivotally to the trailer thereby locking the gooseneck irrotatably to the trailer and permitting them to be removed from the tractor as a unit. Thus the gooseneck and trailer assembly can be removed and replaced without the necessity of a separate lifting apparatus.

Accordingly it is a principal object of the present invention to provide a lifting apparatus for low-boy trailers which is entirely self-contained and which does not require interaction with the ground on which the trailer is supported.

It is the further object of the present invention to provide such a device which will raise the trailer higher than its normal driving position to provide temporary increased ground clearance for the trailer.

It is a still further object of the present invention to provide such a device where the piston cylinders which provide the lifting are entirely enclosed within the structure of the device.

It is a still further object of the present invention to provide such a device which allows locking the gooseneck irrotatably to the trailer for removal as a single unit.

The foregoing objectives, features and advantages of the present invention will be more readily understood upon consideration of the following detailed description of the invention taken in conjunction with the accompanying drawings.

DETAILED DESCRIPTION OF A PREFERRED EMBODIMENT

Figure 2:
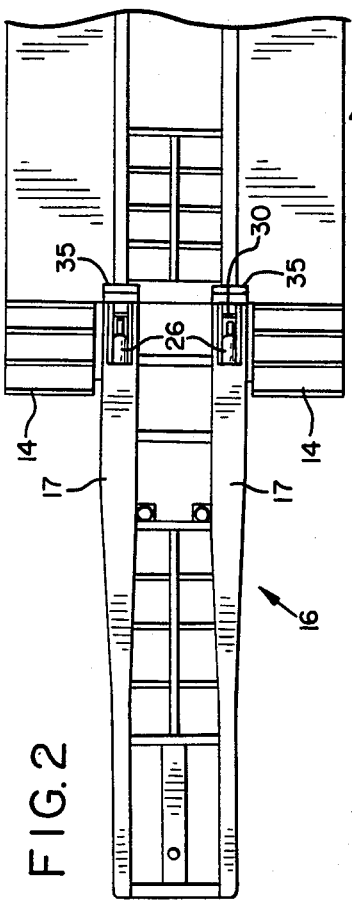
FIG. 2 is a fragmentary plan view of the gooseneck and trailer of FIG. 1.
Figure 1:
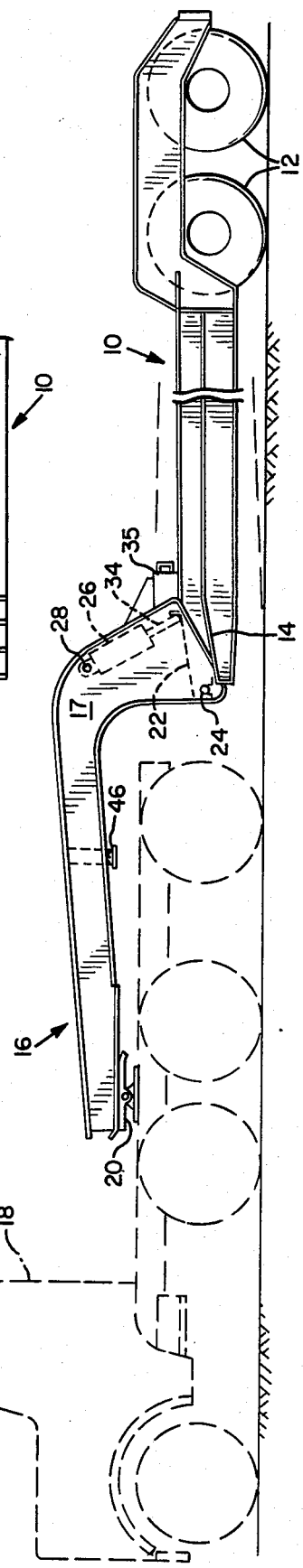
FIG. 1 is a side elevational view of a trailer and gooseneck embodying the lifting apparatus of the present invention, along with a tractor shown in phantom.

Referring to FIG. 1 of the drawings, the present invention includes a trailer 10 of the type commonly referred to as a low-boy trailer. This type of trailer has wheels 12 at its rear portion only and its front portion is unrestricted and contains ramps 14 arranged to allow a vehicle to be driven up onto the bed of the trailer when the trailer is lowered to a loading position where the ramps are in contact with the ground. When the trailer is in a driving position, on the other hand, the ramps are raised above the ground in the position shown in FIG. 1.

The trailer is interconnected to a towing vehicle, such as a tractor 18, by a gooseneck attachment 16. In order to provide lateral stability, the rear portion of the gooseneck is bifurcated into two like side-by-side arms 17. The front end of the gooseneck is pivotably attached to the tractor by conventional means, such as a fifth wheel 20. As a result, the gooseneck, and thus the trailer, not only rotates relative to the tractor about a vertical axis for towing, but rotates about a horizontal axis as well. In addition, the gooseneck is rotatably joined to the trailer through a horizontal pin connection thereby providing a common pivot point between these elements. Therefore the gooseneck can be moved between a raised position, whereby the trailer is in a driving position, and a lowered position, whereby the trailer is in a loading position with the ramps in contact with the ground. In order to allow the trailer to be uncoupled with the gooseneck the connection between the gooseneck and the trailer is made releasable by providing a hook 22 which is located at the front end of the trailer and a mating pin 24 which is located at the lowermost point of the gooseneck.

The lifting apparatus which moves the gooseneck and trailer between the driving and loading positions includes extensible means, such as piston cylinders 26, one of which is associated with each of the arms 17, and which are operated by the towing vehicle's hydraulic system by means of conventional controls (not shown). The cylinder ends of the piston cylinders are rotatably attached to the gooseneck by means such as pins 28 and the rams 34 are position so that they are in sliding contact with positioning pads 30 located on the trailer. Locating brackets 32 associated with the gooseneck act as first stops which limit the forward movement of the rams past a predetermined point to assure that there always is an acute angle between the rams and the pads thereby causing the rams to tend to slide rearwardly on the pads when they are extended. Cups 36 located on the pads act as second stops which prevent rearward travel of the rams on the pads past a predetermined point and which also serve to cradle the rams when they are extended. Thus the rams need not be perfectly positioned at the initiation of lifting and yet they will be located at a relatively fixed point on the trailer during most of the lifting operation.

As in the case with the prior art lifting apparatus the piston cylinders are only used to raise and lower the trailer and gooseneck and these elements are maintained in their raised position during use by means of blocks 35 which are positioned between the gooseneck and the trailer. Also hydraulic jacks 46, which are connected to the gooseneck, contact the frame of the tractor in order to raise and lower the gooseneck and support it for transportation when it is not connected to the trailer.

Figure 7:
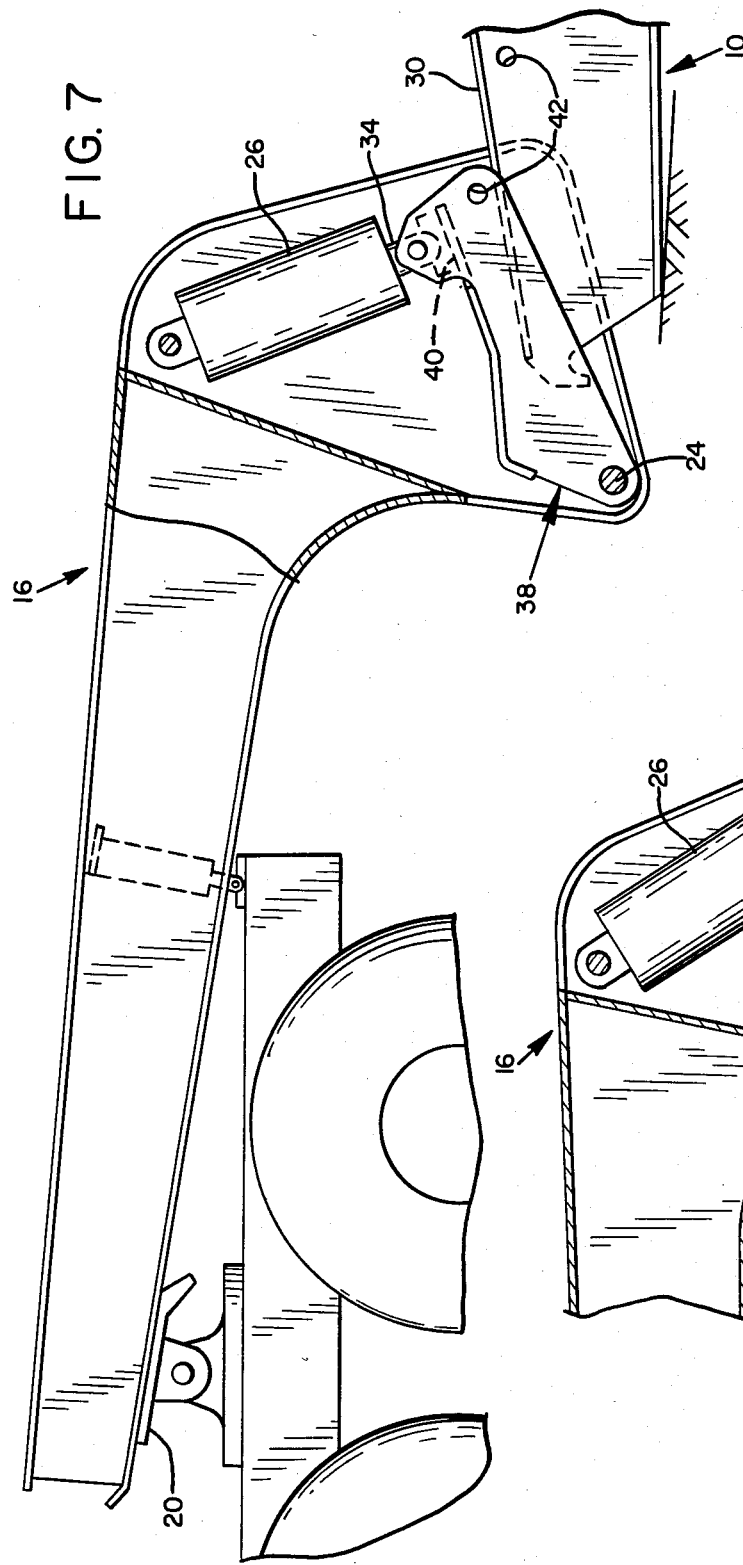
FIGS. 7 and 8 are fragmentary sectional views, similar to FIGS. 3 through 6 showing the sequence of operation of an alternate embodiment of the invention.
Figure 8:
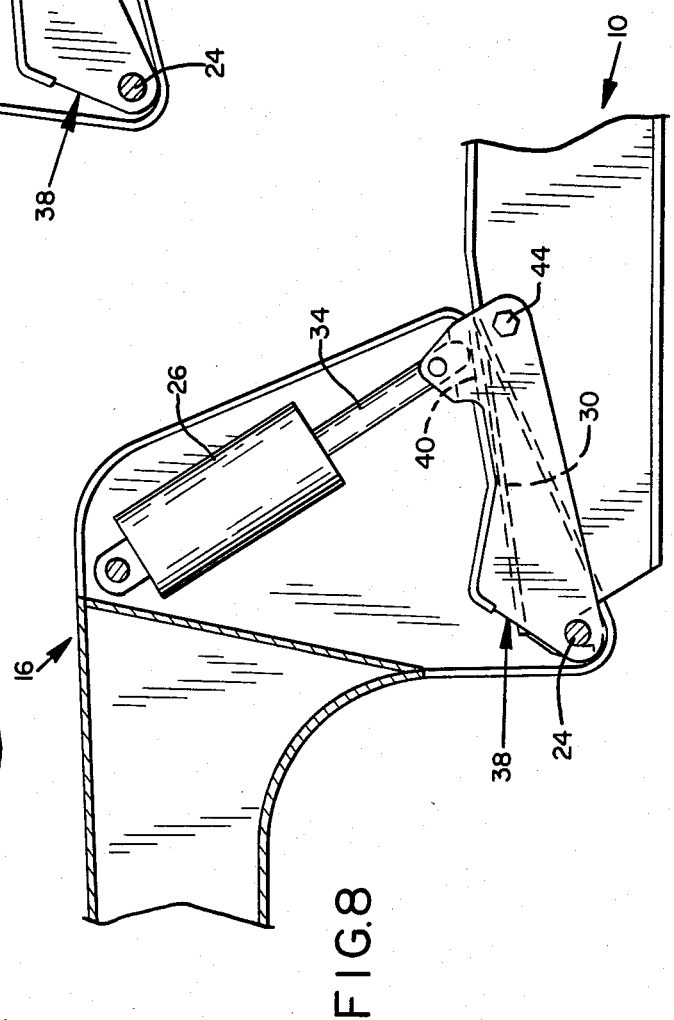

In an alternate form of the invention, shown in FIGS. 7 and 8, the rams 34 of the piston cylinders 26 are not in sliding contact with the positioning heads 30 on the trailer but are pivotally connected to them. In the embodiment shown the rams are pivotally attached to one of the ends of locking units 38. The other ends of the locking units are pivotally attached to the gooseneck 16 by means of the pin 24 which couples the gooseneck to the trailer. Located in the locking units immediately below the ends of the rams 34 are feet 40 which are arranged to contact the positioning pads 30. Mating openings 42 located in the locking units and the trailer 10 are aligned when the gooseneck is coupled to the trailer in order to receive pins 44 therethrough. When the pins 44 are in place in the openings 42 the locking unit functions to effectively couple the piston cylinder 26 to the trailer and thus to prevent the gooseneck from rotating in either direction relative to the trailer as long as the rams 34 are not extended or retracted. Accordingly, the trailer and gooseneck can be removed as a unit from the tractor 18.

Figure 6:
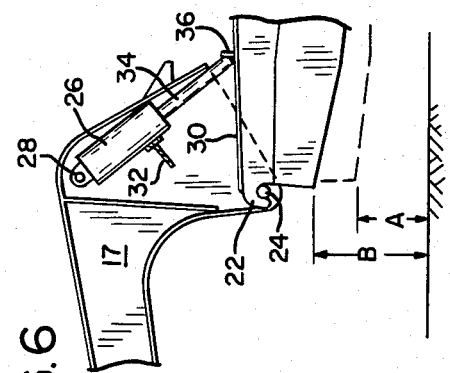
FIGS. 3 through 6 are fragmentary sectional views of the gooseneck and trailer showing the sequence of operation of the lifting apparatus.
Figure 5:
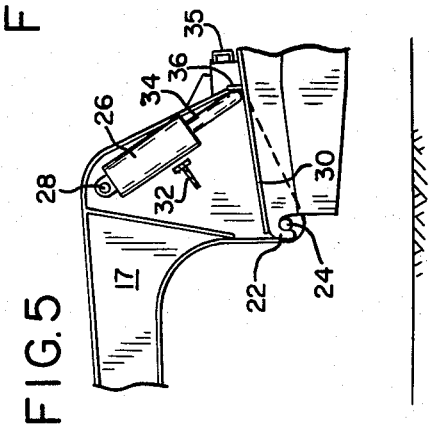
Figure 4:
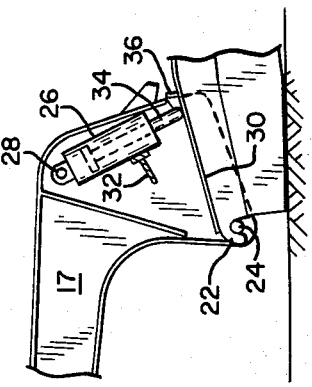
Figure 3:
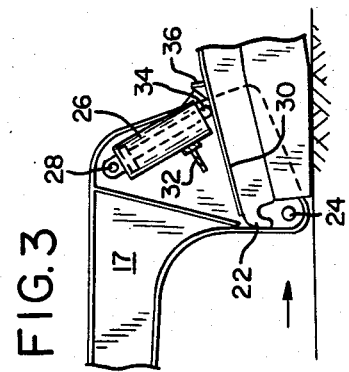

In operation, the tractor 18 is first connected to the trailer when the trailer is in its loading position with the ramps 14 resting on the ground. Accordingly, the jacks 46 are retracted to lower the gooseneck to its lowered position, also proximate the ground, and the tractor is backed up until the pin 24 is positioned directly below the hook 22, FIG. 3. As this occurs the rams 34 for the piston cylinders 26 may come in contact the pads 30 on the trailer, however, the brackets 32 prevent the piston cylinders from being pushed rearwardly past a certain point. The piston cylinders are then actuated to extend the rams 34 thereby raising the gooseneck relative to the trailer until the pin 24 becomes seated in the hook 22, FIG. 4. As the rams are extended they slide slightly rearwardly on the pads from their initial point of contact until they come into registry with the cups 36. Further extension of the rams causes the points at which the piston cylinders are connected to the gooseneck (pins 28) to be moved away from the points at which the rams contact the trailer (cups 36). Due to the location of these points relative to one another and relative to the pin 24, this action cause the gooseneck to rotate counterclockwise and the rear trailer to rotate clockwise relative to the pin 24, referring to the view shown in the drawings Since the gooseneck is restrained against horizontal movement by the fifth wheel 20 and the trailer is free to move horizontally on its wheels 12 this opposite rotation causes the pin 24, and thus the front edge of the trailer, to be raised upwardly. When the trailer has been raised to its normal driving position, the blocks 35 are inserted between the gooseneck and the trailer and the rams retracted slightly so that the gooseneck and trailer are then maintained in their relative positions by the blocks rather than by the piston cylinders, FIG. 5. However, in certain cases, it may be desirable to increase the ground clearance of the trailer by raising it above its normal driving height A to a greater height B, FIG. 6. This can be accomplished by extending the ram again to cause further lifting of the trailer.

When the trailer is ready to be unloaded it is lowered to its loading position by reversing the above described sequence of operations.

When the locking units 38 are utilized the lifting apparatus for the present invention permits the entire gooseneck and trailer assembly to be removed from the tractor as a unit which permits removal and reinstallation of the entire assembly without the necessity of an independent lifting apparatus. This is accomplished by first placing the trailer in its loading position where it is resting on the ground. The tractor is then driven out from under the gooseneck which, because of the piston cylinder, remains in a raised position so that the tractor can later be driven back under it.

The terms and expressions which have been employed in the foregoing specification are used therein as terms of description and not of limitation, and there is no intention in the use of such terms and expressions, of excluding equivalents of the features shown and described or portions thereof, it being recognized that the scope of the invention is defined and limited only by the claims which follow.

What is claimed is:

1. A lifting apparatus for a trailer of the type which is connected to a towing vehicle by means of a gooseneck which is operably independent of the trailer and the towing vehicle, said apparatus comprising:
   (a) said gooseneck and said trailer being rotatably coupled to one another at a common pivot point;
   (b) extensible means extending between a first point located on said trailer and a second point located on said gooseneck, wherein said extensible means is rotatably connected at one extremity thereof to said gooseneck and slidably contacts the trailer at the other extremity thereof;
   (c) said first point, second point and pivot point being arranged relative to one another such that as said extensible means is extended and retracted said gooseneck and said trailer rotate about said pivot point in directions which are opposite to one another;

(d) said gooseneck being arranged such that said extensible means is substantially enclosed therein during the full range of travel of said extensible means; and (e) first stop means associated with said gooseneck for limiting the extent of the transverse movement of said other extremity of said extensible means in a direction toward the towing vehicle.

2. The apparatus of claim 1 including second stop means associated with said trailer for limiting the extent of a sliding movement of said other extremity of said extensible means relative to said trailer in the opposite direction.

3. The apparatus of claim 2 wherein said extensible means is oriented relative to said trailer in a manner such that the extremity of said extensible means is urged toward said second stop means when said extensible means is being extended.

4. In a lifting apparatus for a trailer which is connected to a towing vehicle through a gooseneck which is operably independent of the trailer and the towing vehicle, of the type employing a piston cylinder, one end of which is pivotably attached to the gooseneck and the other end of which slidably contacts the trailer, wherein the trailer and gooseneck are rotatably coupled together at a common pivot point, the improvement comprising:

(a) a locking unit having means for pivotally attaching one end thereof to said gooseneck at the common pivot point and the other end thereof to the end of said piston cylinder which contacts the trailer;

(b) mating openings passing through said trailer and said locking unit, said mating openings being arranged to be in alignment when said trailer is coupled to said gooseneck; and (c) pin means for passing through said aligned openings.

* * * * *